United States Patent [19]

Szlaga

[11] Patent Number: 4,735,226
[45] Date of Patent: Apr. 5, 1988

[54] ANTI-LIFT ROLL-OVER VALVE

[75] Inventor: Emil Szlaga, Connersville, Ind.

[73] Assignee: Stant Inc., Connersville, Ind.

[21] Appl. No.: 920,233

[22] Filed: Oct. 17, 1986

Related U.S. Application Data

[63] Continuation-in-part of Ser. No. 916,879, Oct. 9, 1986, Pat. No. 4,694,847, which is a continuation-in-part of Ser. No. 911,243, Sep. 24, 1986, which is a continuation-in-part of Ser. No. 837,152, Mar. 7, 1986, Pat. No. 4,655,238.

[51] Int. Cl.$^4$ .............................................. F16K 17/36
[52] U.S. Cl. ...................................................... 137/43
[58] Field of Search .................... 137/39, 43, 202, 587

[56] References Cited

U.S. PATENT DOCUMENTS

| | | | |
|---|---|---|---|
| 1,683,338 | 9/1928 | Evinrude . | |
| 2,396,233 | 3/1946 | Abrams . | |
| 2,751,925 | 6/1956 | Axlander | 137/202 |
| 3,768,498 | 10/1973 | Urban | 137/43 |
| 3,916,928 | 11/1975 | Enoch | 137/39 |
| 3,970,098 | 7/1976 | Boswank | 137/39 |
| 3,996,951 | 12/1976 | Parr et al. . | |
| 4,095,609 | 6/1978 | Martin . | |
| 4,162,021 | 7/1979 | Crute . | |
| 4,351,350 | 9/1982 | Crute . | |

Primary Examiner—Robert G. Nilson
Attorney, Agent, or Firm—Barnes & Thornburg

[57] ABSTRACT

A roll-over valve is provided for use in a vehicle fuel system having an outlet for discharging fuel vapor. The roll-over valve includes a hollow valve member that terminates in a distal tip. A roll-over ball is provided for moving the distal tip from an outlet-opening position to an outlet-closing position in response to tilting of the hollow valve member during vehicle rollover conditions. Weighted members in the form of weighted balls are disposed within the hollow valve member to counteract the lifting force that may be imposed upon the hollow valve member by the formation of a low pressure area over the distal tip due to high flow rates of vapor over the tip. The weighted balls aid in preventing the valve member from being urged upwardly to prematurely seal the outlet. The hollow valve member is formed to include a sealed chamber so that a buoyant force is created when fuel enters the valve. The buoyant force created by the sealed chamber when exposed to fuel is sufficient to overcome the oppositely directed force exerted by the weighted balls to permit the hollow valve member to move normally when urged upwardly by the actuating ball in response to tilting of the valve member during vehicle rollover conditions.

27 Claims, 6 Drawing Sheets

ANTI-LIFT ROLL-OVER VALVE

This application is a continuation-in-part of co-pending application Ser. No. 916,879, filed Oct. 9, 1986, now U.S. Pat. No. 4,694,847 entitled ROLL-OVER VALVE WITH SEALING BALL, which is a continuation-in-part of application Ser. No. 06/911,243, filed Sept. 24, 1986, which is a continuation-in-part of application Ser. No. 06/837,152, filed Mar. 7, 1986 now Pat. No. 4,655,238.

BACKGROUND AND SUMMARY OF THE INVENTION

The present invention relates to fuel system valves, and particularly to a roll-over valve for closing a venting passageway in a vehicle fuel system if the vehicle is rolled over in an accident or tilted during breaking or cornering. More particularly, the present invention relates to a roll-over valve having a valve member equipped to counteract aerodynamic lifting forces applied to the valve member during discharge of fuel vapor through the venting passageway that might otherwise move the valve member to prematurely engage and seal an outlet orifice in the venting passageway without impeding movement of the valve member toward an outlet-closing position during vehicle roll-over conditions.

Vehicle fuel systems are known to include pressure-relief roll-over valves that are mountable on either the fuel tank or the filler neck of the vehicle. These conventional roll-over valves are configured to permit fuel vapor to vent from the fuel tank when the vehicle is operating normally, and to prevent fuel from spilling from the fuel tank through the vent when the vehicle is tilted a preselected amount or is rolled over in an accident. Desirably, a roll-over valve should be equipped to accommodate a substantial flow rate of fuel vapor from the fuel tank because of the large size of many fuel tanks and also because of the volatility of many newer blends of fuel. One problem encountered with roll-over valves that are capable of venting a substantial amount of fuel vapor is that the outbound flow of fuel vapor over the distal tip of the valve stem can create a low pressure area that can impose a lifting force on the distal tip to seal an outlet orifice in the venting passageway prematurely. Such premature sealing of an outlet orifice within the valve is not desirable because it blocks venting of fuel vapor from the fuel tank during instances when venting would otherwise occur.

One object of the present invention is to provide a roll-over valve in which the valve member is configured to counteract lifting forces exerted on the distal tip resulting from the formation of a low pressure area above the valve member that could cause the distal tip to seal an outlet orifice in the valve prematurely.

Another object of the present invention is to provide a roll-over valve equipped to retain the valve member in its outlet-opening position until the valve member is actuated to move toward an outlet-closing position in response to tilting the valve member during vehicle rollover conditions.

Yet another object of the present invention is to provide a roll-over valve equipped to counteract movement-inducing effects of aerodynamic lift forces exerted on the distal tip of a valve member due to high fuel vapor flow conditions existing in a venturi passage between the distal tip and the outlet during discharge of fuel vapor through the outlet so that premature sealing engagement of the distal tip and the outlet is substantially prevented.

Still another object of the present invention is to provide a roll-over valve having a buoyant internal chamber sized to float the valve member in fuel displaced by the valve member during vehicle rollover conditions to exert buoyant forces on the valve member which neutralize lift-counteracting forces applied to the valve member, thereby permitting normal unimpeded movement of the valve member toward its outlet-closing position during a vehicle rollover conditions.

According to the present invention, a roll-over valve is provided for use in a vehicle fuel system having outlet means for discharging fuel vapor. The roll-over valve includes a hollow valve member, roll-over means for moving the hollow valve member from an outlet-opening position to an outlet-closing position in response to tilting the hollow valve member during vehicle rollover conditions, and anti-lift means in the hollow valve member for counteracting external aerodynamic forces exerted on the hollow valve member during discharge of fuel vapor through the outlet means.

In preferred embodiments, the anti-lift means is positioned in a region provided between the outlet means and the roll-over means in spaced-apart relation to the roll-over means. The anti-lift means include means for applying a downwardly-directed predetermined retaining force to the hollow valve member to aid in preventing premature upward movement of the hollow valve member toward closing engagement with the outlet means and means for neutralizing the predetermined retaining force during vehicle rollover conditions to permit normal unimpeded movement of the hollow valve member toward its outlet-closing position during operation of the roll-over means.

In preferred embodiments, the applying means includes at least one weighted member positioned within the interior of the buoyant container and movable therein. Desirably, the at least one weighted member has a predetermined mass selected to cause the magnitude of the downward predetermined retaining force to be substantially equivalent to the magnitude of the upward external aerodynamic forces.

Desirably, the neutralizing means includes a buoyant container having a volume selected to displace a predetermined amount of fuel in the vehicle fuel system during vehicle rollover conditions so that the buoyant container generates an upward buoyant force having a magnitude that is substantially equivalent to the magnitude of the downward predetermined retaining force.

The roll-over means desirably includes a movable roll-over ball member and at least one inclined ramp portion contacting the roll-over ball in camming relation. In operation, the roll-over ball rides on the at least one inclined ramp portion in a radially-outward direction in response to tilting of the hollow valve member to move the hollow valve member to its outlet-closing position. The applying means and the neutralizing means are configured to exert substantially equal and opposite forces on the roll-over means during vehicle roll-over conditions so that inertial movement of the roll-over ball in the radially-outward direction on the at least one inclined ramp portion due to inertia of the roll-over established during tilting of the hollow valve member is substantially unaffected by the downward predetermined retaining force provided by the at least one weighted member.

One feature of the present invention is provision of anti-lift means in the hollow valve member for continuously retaining the hollow valve member in its outlet-opening position until the hollow valve member is moved toward its outlet-closing position by the roll-over means. The anti-lift means normally operates to counteract movement-inducing effects of aerodynamic lift forces exerted on the distal tip of the valve member due to high fuel vapor flow conditions existing in the venturi passage during discharge of fuel vapor through the outlet means. Advantageously, premature sealing engagement of the distal tip and the outlet means is substantially prevented due to application of a downward retaining force generated by the weighted members on the hollow valve member.

Another feature of the present invention is the formation of hollow valve member to include a sealed buoyant chamber configured to float the hollow valve member in fuel displaced by the hollow valve member during vehicle rollover conditions. Advantageously, the buoyant chamber exerts a buoyant force on the hollow valve member which neutralizes the downward retaining force provided by the weighted members to permit normal unimpeded movement of the hollow valve member toward its outlet-closing position during operation of the roll-over means.

Another feature of the present invention is that the buoyant sealed interior chamber and the at least one weighted member are sized and shaped to exert substantially equal and opposite forces on the roll-over means during vehicle rollover conditions. In operation, movement of the roll-over ball in the radially-outward direction on the at least one inclined ramp portion due to its own inertia established during tilting of the hollow valve member will be substantially unaffected by the downward predetermined retaining force.

Additional objects, features, and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figures 1, 2, 3:
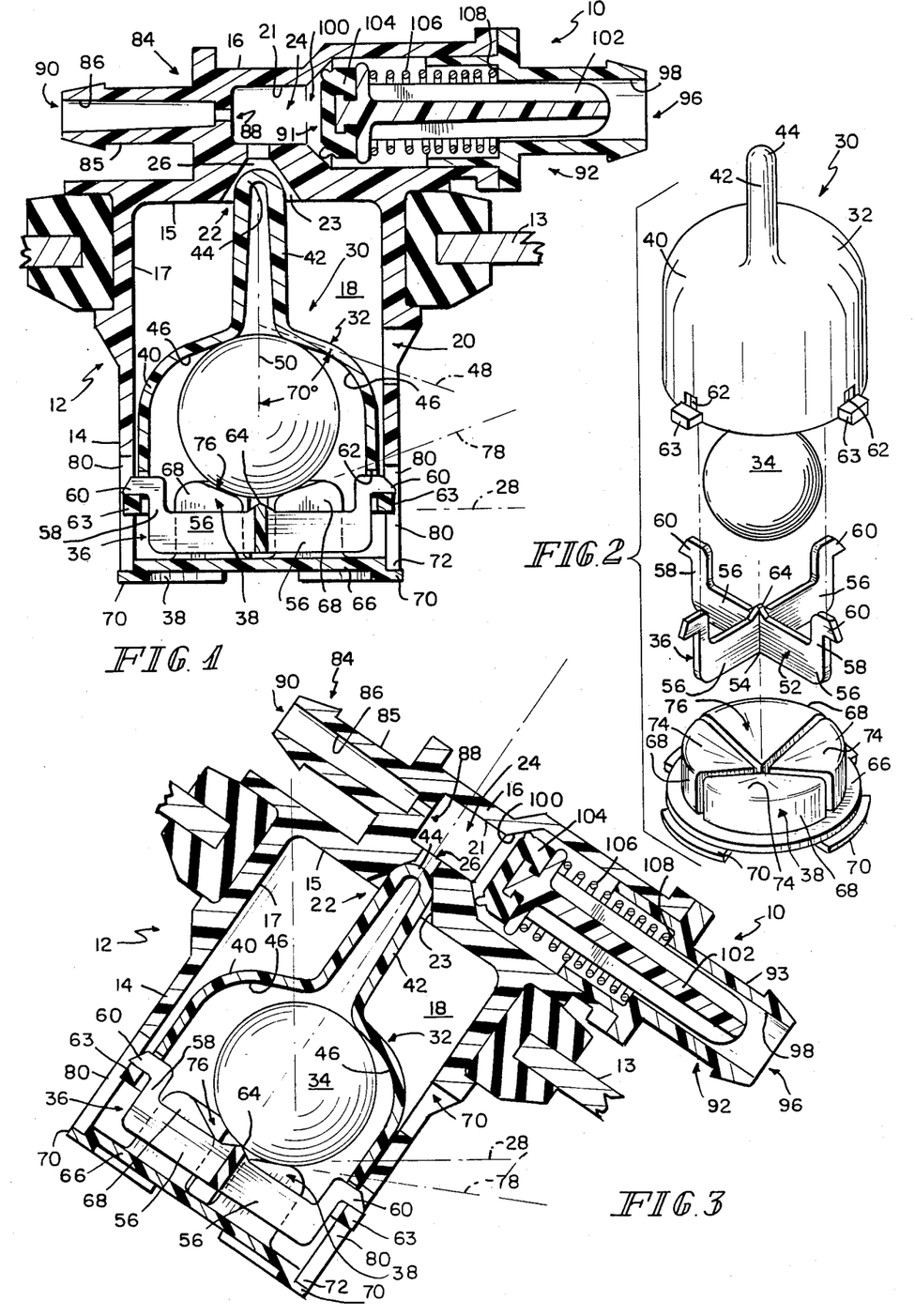
FIG. 1 is a sectional detail view of one embodiment of a valve in accordance with the present invention showing the valve in a normal, upright position.
FIG. 2 is an exploded assembly view of one portion of the valve shown in FIG. 1.
FIG. 3 is a view of the valve illustrated in FIG. 1 showing the valve in a tilted position.

A first embodiment of the invention is illustrated in FIGS. 1-3. A valve assembly 10 is provided for use with a conventional fuel system (not shown) having a fuel tank and a fuel vapor storage canister. Referring particularly to FIGS. 1 and 3, the valve assembly 10 includes a hollow valve housing 12 mounted to a wall 13 of a fuel tank or the like and having a lower roll-over safety portion 14 and an upper pressure-relief portion 16.

The lower roll-over safety portion 14 includes a top wall 15 and a generally cylindrical side wall 17 which cooperate to define a valve chamber 18 having an inlet 20 formed in the side wall 17 and an outlet 22 formed in the top wall 15. The inlet 20 is in fluid/vapor communication with a fuel tank or the like. The lower portion 14 is formed to include an axially downwardly-facing, generally conical valve seat 23 in concentric registry with outlet 22.

The upper pressure-relief portion 16 is formed to include an interior wall 21 defining a vapor discharge chamber 24, and a passageway 26 interconnecting the vapor discharge chamber 24 and the outlet 22 of the valve chamber 18 in fluid/vapor communication. During vehicle operation, fuel vapors accumulated in the fuel tank are introduced into the valve chamber 18 under pressure. These fuel vapors are selectively transmitted via fluid-conducting passageway 26 to the vapor discharge chamber 24 for subsequent distribution to the canister (not shown) and to the atmosphere.

A roll-over assembly 30 is installed in the lower portion 14 to control fluid flow through the fluid-conducting passageway 26. The roll-over assembly 30 automatically closes the valve chamber outlet 22 during vehicle rollover and change in vehicle motion to prevent the flow of liquid fuel and/or fuel vapors through passageway 26 and into both of the canister and the atmosphere, thereby lessening the danger of explosion or other hazard.

As soon as a rolled-over vehicle is substantially returned to an upright position, the roll-over assembly 30 functions to open the valve chamber outlet 22 to permit resumption of unimpeded flow of fuel vapors through passageway 26. As shown best in FIG. 2, the roll-over assembly 30 includes a valve member 32, a stainless steel ball 34, a ball retainer 36, and a valve member retainer 38. The roll-over assembly 30 can be preassembled in a manner described below and installed in the valve chamber 18.

The valve member 32 includes a downwardly opening ball-receiving cup 40 and an integral upstanding valve stem 42. The valve stem 42 has a distal, spherical end 44 for engaging valve seat 23 to close the chamber outlet 22. An interior wall of the cup 40 is configured to define a novel first inclined ramp portion 46. As shown best in FIG. 1, the first inclined ramp portion 46 is substantially defined by a downwardly-extending generatrix 48 to present a downwardly-opening, outwardly-extending, contoured, flared camming surface. Illustratively, the first inclined ramp portion 46 is positioned in relation to the longitudinal axis 50 of the valve housing 12 to define an included angle of about 70°. In other words, the novel first ramp portion 46 is inclined at an angle of about 20° relative to horizontal reference plane 28.

The ball retainer 36 includes a crisscross frame 52 for retaining the ball 34 in the inverted cup 40. The crisscross frame 52 includes a center portion 54 and four mutually perpendicular arms 56 extending away from center portion 54. Each arm 56 includes a distal end 58 and an outwardly turned L-shaped mounting tab 60 extending upwardly therefrom for snapping into engagement with four circumferentially spaced-apart mounting holes 62 formed in the lowermost portion of the inverted cup 40. A tab-supporting flange 63 is provided on the exterior of the cup 40 underneath each mounting hole 62 to support a mounting tab 60 extending therethrough. A raised contact surface 64 extends upwardly from the center portion 54 of the crisscross frame 52 to a point below the uppermost extension of the mounting tabs 60.

The valve member retainer 38 illustratively includes a base member 66 and four integral upstanding wedge members 68 for retaining the valve member and ball retainer assembly 32, 36 in the valve housing 12. The base member 66 includes mounting flanges 70 for snapping into engagement with circumferentially spaced-apart channels 72 formed in the lowermost portion of valve housing 12 as shown best in FIGS. 1 and 3.

The distal ends 74 of upstanding wedge members 68 cooperate to define a second inclined ramp portion 76. As shown best in FIG. 1, the second inclined ramp portion 76 is substantially defined by an upwardly-extending generatrix 78 to present an upwardly-opening, outwardly-extending, contoured, flared camming surface. Illustratively, the second inclined ramp portion 76 is positioned in relation to the longitudinal axis 50 of the valve housing to define an included angle of about 70°. In other words, the second ramp portion 76 is inclined at an angle of about 20° relative to horizontal reference plane 28. Advantageously, the first and second inclined ramp portions 46, 76 cooperate to convert radially-outward movement of a ball disposed therebetween in camming relation into axially-upward movement of the valve stem 42 toward the chamber outlet 22 during tilting of the valve housing 12.

The roll-over assembly 30 illustrated in FIG. 2 is assembled and installed in the valve chamber 18 in the manner described below. When assembled, the valve member 32 is movable within the valve chamber 18 between a chamber outlet-opening position shown in FIG. 1 and a chamber outlet-closing position shown in FIG. 3.

The ball retainer 36 is coupled to the valve member 32 to retain a ball 34 disposed within the interior of the inverted cup 40 by inserting the mounting tabs 60 of the crisscross frame 52 into the respective mounting holes 62 formed in the cup 40 in abutting relation to the tab-supporting flanges 63. The valve member 32 and the ball retainer 36 are configured to permit movement of the trapped ball 34 in a radially-outward direction during tilting of the valve housing while substantially limiting movement in axially outward and inward directions. The valve member retainer 38 is then interengaged with the ball retainer 36 by inserting the four distal ends 74 of the upstanding wedge member 68 into the four spaces intermediate mutually-perpendicular frame arms 56. This "loose" assembly is then mounted in the valve housing 12 by: (1) inserting the valve stem 42 into the lower opening in the valve housing 12 so that the valve stem 42 extends through the chamber outlet 22 and is in close proximity to valve seat 23; (2) inserting mounting tabs 60 and companion tab-supporting flanges 63 into a like plurality of axially elongated circumferentially spaced-apart guide slots 80 formed in the valve housing 12 as shown in FIGS. 1 and 3; and then (3) interengaging the mounting flanges 70 of the base member 66 and the channels 72 formed in the valve housing 12.

When assembled, the valve member retainer 38 is fixed in relation to the valve housing 12 while the valve member and ball retainer assembly is guided by guide slots 80 for movement along the longitudinal axis 50 of the valve housing between chamber outlet-closing and -opening positions. In addition, when the valve member 32 is in its chamber outlet-opening position, the second inclined ramp portion 76 is situated to overlie the contact surface 64 so that the downwardly-presented surface of the ball 34 is seated on the second inclined ramp portion 76 without contacting the contact surface 64 of the ball retainer 36. As will be explained, the contact surface 64 provides means for transmitting the gravitational force of the ball 34 to the valve member 32 via the ball retainer 36 to aid in moving the valve member 32 from its outlet-closing position toward its outlet-opening position.

A constant orifice valve 84 is provided in the upper pressure-relief portion 16 of the valve housing 12 for discharging a substantially constant volumetric flow rate of fuel vapor from the hollow valve housing 12 to a canister (not shown). The constant orifice valve 84 includes an overflow tube 85 having a fluid-conducting passageway 86. The passageway 86 includes an inlet orifice 88 of uniform cross-section in fluid communication with the vapor discharge chamber 24 and an outlet 90 that is connectable to a conventional canister. Fuel vapors discharged from the fuel tank into the vapor discharge chamber 24 are distributable to the canister via constant orifice valve 84.

A variable flow valve 92 is also provided in the upper pressure-relief portion 16 of the valve housing 12 for selectively discharging a controlled volume of fuel vapor from the hollow valve housing 12 to the atmosphere. The variable flow valve 92 includes a purge tube 93 having an inlet orifice 94 in fluid communication with the vapor discharge chamber 24, an outlet orifice 96 that empties into the atmosphere, and a fluid-conducting passageway 98 extending therebetween. The innermost portion of passageway 98 is formed to include a generally conical valve seat 100 in concentric registry with the inlet orifice 94. The valve seat 100 defines a diverging nozzle extending in a direction toward the outlet orifice 96.

In order to vary selectively the flow of fuel vapor to the atmosphere through passageway 98, an elongated valve stem 102 having a valve seal 104 at its innermost end is positioned in passageway 98. The valve seal 104 is yieldably urged into closing engagement with the valve seat 100 by means of a coiled compression spring 106 which seats on an abutment ring 108 formed to extend into the passageway 98 intermediate the inlet 94 and outlet 96.

In operation, ball 34 rides on both of the opposing first and second inclined camming surfaces 46, 76 to move the valve stem 42 upwardly into closing engagement with the valve seat 23 surrounding the chamber outlet 22 in response to tilting movement of the valve housing 12 during vehicle rollover and abrupt changes in vehicle motion. Illustratively, included angles of about 70° are formed between the longitudinal axis 50 and each of the ramp-defining, upwardly-extending and downwardly-extending generatrices, 78 and 48, respectively. These particular angles were selected so that the novel pair of opposing companion inclined surfaces would cooperate to convert radially outward movement of ball 34 into axially upward movement of valve member and ball retainer assembly 32, 36 so as to cause the valve stem 42 to move into closing engagement with valve seat 23 when the longitudinal axis 50 is tilted at least at an angle of about 35° (See FIG. 3) from its normal upright vertical position (See FIG. 1).

One object of the present invention is to provide a fuel tank valve having a roll-over safety valve, an integral flow orifice to control fuel vapor flow to the canister, and also an on/off vapor release valving mechanism for purging fuel tank vapors to the atmosphere. Advantageously, the vapor release valve provides means for venting selected amounts of fuel tank vapor to the atmosphere to improve hot engine performance by minimizing fuel tank pressure and reducing fuel vapor mass flow to the canister. The vapor release valve of the present invention permits excess pressure to be relieved to the atmosphere. This protects the purge air from becoming excessively saturated, and consequently, enhances vehicle driveability. The novel "double ramp" design of the roll-over assembly 30 effectively overcomes problems that were encountered during the development of a fuel tank valve having a canister discharge valve (e.g., 84) and an atmosphere discharge valve (e.g., 92).

During development of the fuel tank valve of the present invention, it became necessary to enlarge the chamber outlet orifice 22 to accommodate the increased fuel vapor flow rate created by the addition of atmospheric purge valve means 92, and also meet minimum performance criteria. One problem caused by enlargement of the chamber outlet orifice 22 was an increase in the differential pressure at the chamber outlet 22. This increased differential pressure increased an upwardly-directed applied force on the valve stem 42 in each of a roll-over and excessive vibration condition. This applied force acted to retain unnecessarily the valve stem 42 in its seated vent passageway-closing position (See FIG. 3) long after the rolled over vehicle (and tilted fuel tank valve) had been returned to an upright position (See FIG. 1) following an accident. Such an unwanted applied force has also been observed in cases where a vehicle fuel tank valve having an enlarged chamber outlet 22 is subjected to excessive vibration.

The foregoing developmental "valve closure" problem was alleviated in the present invention by increasing the mass of the ball 34 to increase the downwardly directed gravitational force of the ball 34 and thereby counteract the pressure- or vibration-induced upwardly-directed applied force on the valve stem 42. This was accomplished by enlarging the diameter of the ball 34 itself a sufficient amount to nearly double the weight of the ball 34. However, one problem caused by enlargement of the ball 34 was an effective reduction in the ball-receiving space defined by inverted cup 40 and the ball retainer 36. Packaging requirements prohibited increasing the volume of inverted cup 40 to compensate for enlargement of the ball 34. In effect, necessary enlargement of the ball diameter without increasing the cup diameter created a geometric condition that limited radially outward travel of trapped ball 34 and thereby reduced the axial travel of the valve member 32 in the valve chamber 18 during vehicle rollover. The effect of such a reduction in axial travel of the valve member 32 was that the ball 32 did not operate to lift the valve stem 42 into closing engagement with valve seat 23 when the longitudinal axis 50 of the valve housing 12 was tilted at an angle of about 20° relative to vertical during the vehicle roll-over accident.

The novel "double ramps" 46, 76 of the present invention provide a remedy to the foregoing developmental problems by increasing the vertical lift of the valve member 32 without necessitating enlargement of the volume of inverted cup 40 to provide space for increased radially outward movement of the valve member-driving ball 34 during vehicle rollover. Although each of the generatrices 48, 78 of camming ramps 46, 76 are inclined at an angle of about 20° in relation to horizontal reference plane 28, the positioning of camming ramps 46, 76 in opposing spaced-apart facing relation causes the camming ramps 46, 76 to cooperate to define an "effective ramp surface" of about 40° in relation to horizontal reference plane 28. This novel feature advantageously operates to increase valve member lift without actually increasing the slope of the generatrix 78 of the first inclined ramp portion 76 to a theoretically necessary above-noted angle of about 40°.

In summary, the function of the valve member and ball retainer assembly 32, 36 is twofold. First, the novel configuration of inverted cup 40 defining first inclined ramp portion 46 operates to position the valve stem 42 in closing engagement with the valve seat 23 when the valve housing is tilted at an angle of about 20° in relation to the vertical during vehicle rollover. Second, the contact surface 64 of the ball retainer 36 engages the downwardly-facing surface of ball 34 as the valve member 32 travels from its outlet-closing to its outlet-opening position to provide sufficient downward force on the valve stem 42 to prevent the valve stem 42 from being held against the valve seat 23 surrounding the chamber outlet 22 during a vapor flow condition caused by vehicle rollover, excessive valve housing vibration, or the like.

Figure 4:
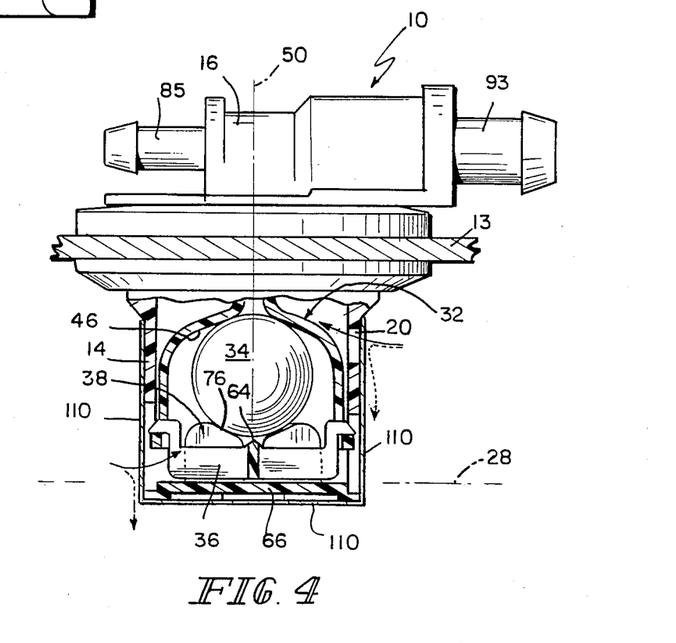
FIG. 4 is a sectional detail view of another embodiment of the present invention.

In another embodiment of the invention illustrated in FIG. 4, those elements referenced by numbers identical to those in FIGS. 1-3 perform the same or similar function. A discriminator filter 110 is positioned to cover the vapor flow inlet openings (e.g. 20) in the lower portion 14 of valve housing 12. One object of filter 110 is to retard liquid fuel flow into and through the valve assembly 10 during times of excessive fuel sloshing in the fuel tank, thereby advantageously minimizing unnecessary discharge of fuel through the valve assembly 10.

Preferably, the filter 110 is formed of a porous Plastics material or the like which retards liquid fuel flow (represented by broken lines in FIG. 4) into the valve chamber 18 without substantially impairing the flow of fuel vapor (represented by solid lines in FIG. 4) through the vapor flow inlet openings. In the embodiment illustrated in FIG. 4, filter 110 is a porous skirt positioned to surround and embrace the exterior wall of the lower portion 14 of valve housing 12. It will be appreciated that filter 110 could be formed and positioned in a variety of other shapes and manners without impairing the operation thereof.

Figure 5:
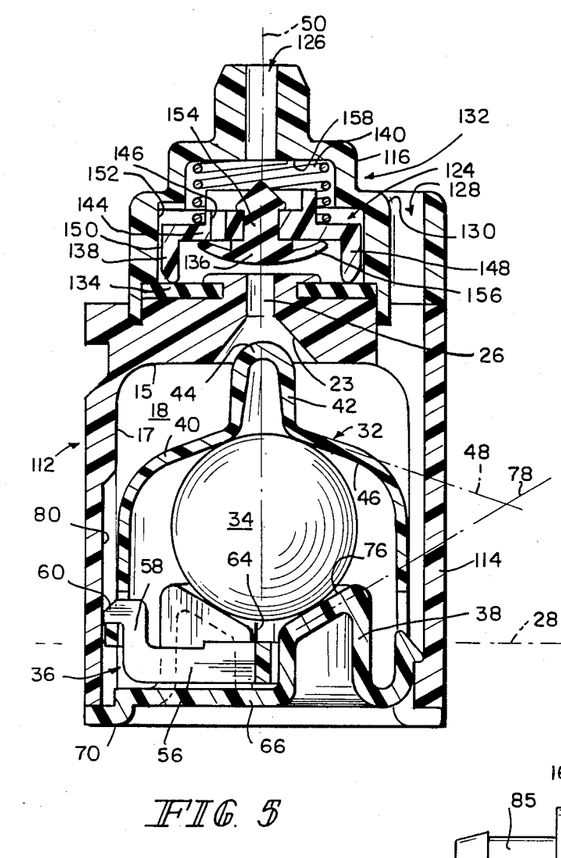
FIG. 5 is a sectional detail view of yet another embodiment of the present invention.

In another embodiment of the invention illustrated in FIG. 5, those elements referenced by numbers identical to those in FIGS. 1-3 perform the same or similar function. In the embodiment of the valve assembly shown in FIG. 5, valve housing 112 includes a lower roll-over safety portion 114 and an upper tank pressure control valve portion 116. The valve housing 112 can be mounted in a fuel sender unit (not shown) or in any other convenient position within the fuel tank.

The components housed in the lower roll-over safety portion 114 function in a manner similar to that shown in FIGS. 1-3. However, in this embodiment the second inclined ramp portion 76 is configured so as to position the upwardly-extending generatrix 78 in relation to the longitudinal axis 50 of the valve housing to define an included angle of about 60°. In other words, the second ramp portion is inclined at an angle of about 30° relative to the horizontal reference plane 28. This incline is about 10° steeper in comparison to the incline illustrated in the embodiment of FIGS. 1-3 so as to delay slightly the actuation of the roll-over valve to meet predetermined performance criteria. It will be understood that the inclined angles of either or both of ramp portions 46, 76 can be varied to change the "effective ramp surface" provided by the novel double ramps 46, 76 of the present invention.

The upper tank pressure control valve portion 116 functions to regulate the pressure within the fuel tank (not shown) thereby advantageously controlling maximum fuel tank pressure.

In particular, the upper portion 116 is formed to include a vapor discharge chamber 124 in fluid communication with the fluid-conducting passageway 26, an outlet passage 126 in fluid communication with the vapor discharge chamber 124, and an inlet passage 128 in fluid communication with the valve chamber 18 formed in the lower portion 114. Importantly, inlet mouth 130 of the inlet passage 128 is positioned about at the highest location within the fuel tank (not shown) to reduce the likelihood of liquid-fuel carryover into the valve assembly during fuel sloshing. Of course, a discriminator filter, similar in function to filter 110 of FIG. 4, could be installed at a suitable location to filter fuel vapor introduced into inlet passage 128.

A pressure-vacuum valve assembly 132 is installed in vapor discharge chamber 124 to regulate pressure in the fuel tank (not shown). The pressure-vacuum valve assembly 132 includes a gasket 134, an umbrella valve 136, a valve carrier 138, and a spring 140. The gasket 134 is positioned on a bottom wall 142 of valve vapor discharge chamber 124 to surround passageway 26. The valve carrier 138 includes a central portion forming four circumferentially-spaced fluid-conducting apertures 146, a peripheral ring flange 148 defining an exterior sidewall 150 positioned in close proximity to an interior wall 152 of the vapor discharge chamber 124 to define an annular passageway therebetween. The umbrella valve 136 is made of a pliable material and includes a stem 154 that is installed in a central aperture formed in the valve carrier 138 and a resilient valve cover 156 that is positioned normally to cover the lower opening of each of the circumferentially-spaced fluid-conducting apertures 146 formed in the valve carrier 138 as shown in FIG. 5. The spring 140 is installed in the vapor discharge chamber 124 between a top wall 158 thereof and a top surface of the valve carrier 138. Thus, the spring 140 provides means for yieldably urging the ring flange 148 into seating engagement with the gasket 134.

In operation, the spring-biased valve carrier 138 functions to vent fuel vapor from the fuel tank and valve assembly only when the pressure exceeds a predetermined threshold level. Pressurized fuel tank vapor can exert a lifting force on the valve carrier 138 to urge the same against the spring 140, thereby lifting ring flange 148 off gasket 138 to open the annular passageway between the valve carrier 138 and the interior chamber wall 152. The fuel vapor is then discharged from the valve housing 112 via outlet 126 and conducted to a treatment site such as a conventional fuel canister (not shown). The mass and configuration of a valve carrier 138, the size of the various fluid-conducting passages, and the spring constant of the spring are selected to define the threshold pressure level. Thus, the pressure-vacuum valve assembly 132 functions to regulate the maximum pressure allowable in the fuel tank (not shown).

The umbrella valve 136 regulates flow of ambient air or the like from the canister into the valve chamber 18 and the fuel tank in response to suction caused by a vacuum in the fuel tank. Sub-atmospheric pressure in the fuel tank will exert a downwardly-directed force to the resilient valve cover 156 to at least partially open the umbrella valve 136 and draw ambient air or the like through outlet passage 126 and valve carrier apertures 146 into the valve chamber 118 via the fluid-conducting passageway 26. A vacuum created in the fuel tank, due to condensation or the like, will act to draw fuel/fuel vapor from the canister back into the tank. This will prevent the pressure in the fuel tank from dropping to zero and hold the tank pressure constant during an overnight vehicle cool-down or short-term vehicle parking.

One notable feature of this embodiment is that fuel vapor is introduced into the valve chamber 18 only from a point above the valve member 32 so that the fuel vapor is shunted generally away from the interior of the ball-receiving cup 40 defined by the valve member 32. Advantageously, this feature causes the vapor path within the valve housing 112 generally to "push down" on the exterior surface of the valve member 32 and thereby substantially prevent fuel vapor from prematurely lifting the valve member 32 toward its vent-closing position within the valve chamber 18 prior to vehicle rollover.

Figure 6:
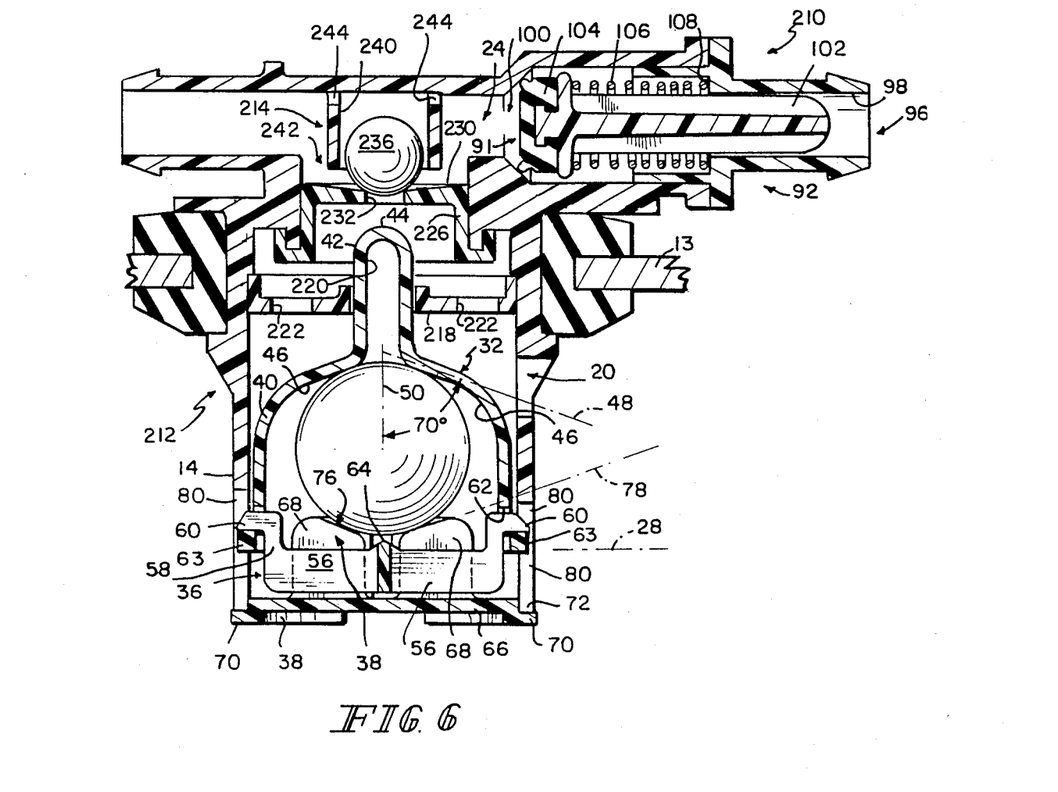
FIG. 6 is a transverse sectional view through yet another embodiment of the present invention.
Figure 7:
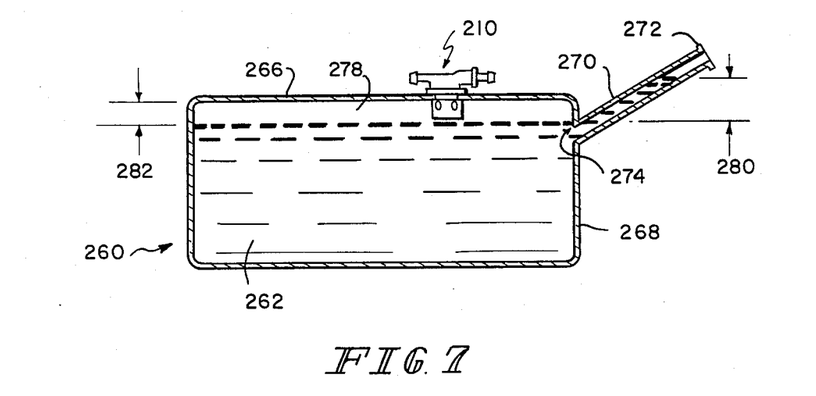
FIG. 7 is a diagrammatic illustration of the valve assembly of FIG. 6 in a working environment.

FIG. 6 shows another embodiment of the invention that is a modification of the embodiment illustrated in FIG. 5. Those elements referenced by numbers identical to those in FIGS. 1-5 perform the same or similar function. In the embodiment of the valve assembly 210 shown in FIG. 6, valve housing 212 includes a pressure valve assembly 214 to control the discharge of pressure from the fuel tank 260 (FIG. 7). The pressure valve assembly 214 functions somewhat differently than the pressure-vacuum valve assembly 132 illustrated in the embodiment of FIG. 5. Specifically, the pressure-vacuum valve assembly 132 in the embodiment illustrated in FIG. 5 is configured to maintain a predetermined pressure within the fuel tank at all times. The valve assembly 132 is configured to vent fuel vapor from the fuel tank only when the pressure in the tank exceeds this predetermined threshold level. The pressure valve assembly 214 illustrated in the embodiment of FIG. 6 is configured to maintain a preselected pressure within the fuel tank only during the fuel tank filling operation. At all other times of vehicle operation, the pressure valve assembly 214 is configured to permit venting of fuel vapor from the fuel tank in a generally unrestricted manner.

The pressure vacuum assembly 214 in the embodiment illustrated in FIG. 6 includes a platform 226 that is disposed above the valve stem 42. The platform 226 includes an upper surface 230 and a centrally disposed orifice 232 formed therethrough. A sealing ball 236 is provided to generally rest upon the upper surface 230 and to seat in the orifice 232 when the valve housing 212 is in a stationary condition. The upper surface 230 of the platform 226 and the size of the orifice 232 cooperate to permit the sealing ball 236 to be relatively easily displaced from the orifice 232 whenever the vehicle (not shown) and valve assembly 210 are disturbed, such as when the vehicle is being driven.

A baffle guide plate 218 is provided below the platform 226 to pilot the valve stem 42 as the valve stem 42 and spherical end 44 move toward the orifice 232 to seal the orifice 232. The movement of the valve stem 42 has been discussed in relation to other embodiments of this invention, and will not be further discussed here. Because the conical valve seat 23 illustrated in FIG. 5 is not included in the embodiment shown in FIG. 6, the baffle guide plate 218 is required to accurately guide the valve stem 42 and spherical end 44 to seal the orifice 232. The baffle guide plate 218 includes a central opening 220 that is sized to receive and laterally retain the valve stem 42. Vent openings 222 are provided in the baffle guide plate 218 to permit venting communication between the fuel tank and the pressure valve assembly 214. Illustratively, four vent openings 222 are provided that are circumferentially spaced around the baffle guide plate 218. The guide plate 218 also aids in preventing fuel from sloshing upwardly through the valve assembly 210 and into the canister (not shown).

A ball guide 240 is provided to retain the ball 236 generally above the orifice 232. As illustrated, the ball guide 240 is a generally cylindrically shaped member that has an inside diameter somewhat greater than the diameter of the ball 236. The greater diameter of the ball guide 240 is provided to permit the ball 236 to move laterally on the upper surface 230 whenever the vehicle is in motion. It will be understood that permitting the ball 236 to move laterally upon the upper surface 230 permits the ball 236 to move away from the orifice 232 to permit fuel vapor to vent through the orifice 232 and outwardly toward the canister (not shown). Thus, this lateral movement, or "rattle" of the ball 236 permits generally unrestricted venting of the fuel tank when the vehicle is in motion. However, when the vehicle is not in motion, the ball 236 provides a preselected, yieldable sealing force to seal the orifice 232 to maintain a preselected pressure within the fuel tank. This preselected pressure within the fuel tank is advantageous during the fuel filling operation of the fuel tank, and will be discussed in greater detail later.

The ball guide 240 is mounted in the valve housing 212 in a manner to create an annular space 242 between the lower end of the ball guide 240 and the upper surface 230 of the platform 226. This annular space 242 provides a venting passageway for the fuel vapor to vent to the canister (not shown). In addition to the space 242, openings 244 are included in the upper portion of the ball guide 240 to provide additional venting passageways for the fuel vapor.

FIG. 7 illustrates one possible use of the valve assembly 210 that is illustrated in FIG. 6. In particular, FIG. 7 shows the valve assembly 210 in place in a fuel tank 260 that may be installed in a vehicle (not shown). The fuel tank 260 is configured to hold a volatile fuel 262 that is capable of producing fuel vapor. The fuel tank 260 includes an upper wall 266 and a sidewall 268. As shown, the valve assembly 210 is fitted into the upper wall 266. It will be understood that the valve assembly 210 will normally be connected to a conventional canister (not shown) to receive the vented fuel vapor. It will be further understood that the valve assembly 210 could be positioned at other locations within the fuel system (not shown) other than that illustrated in FIG. 7. A filler neck 270 is shown extending upwardly and outwardly from the sidewall 268 of the fuel tank 260. The filler neck 270 includes an outer filler end 272 that is configured to receive fuel in any conventional manner. The filler neck 270 further includes an inner end 274 that joins with the sidewall 268 to provide fluid communication between the filler neck 270 and the fuel tank 260.

In operation, the valve assembly 210 functions similar to the embodiments shown in FIGS. 1–5 to permit fuel vapor to be vented from the fuel tank 260 to the canister (not shown). The valve assembly 210 differs from the embodiment illustrated in FIG. 5 in that when the vehicle (not shown) is in motion, the valve assembly 210 permits generally unrestricted venting of fuel vapor from the fuel tank 260. It will be understood that such generally unrestricted venting may be desirable in certain applications, while the embodiment in FIG. 5 may be desirable in other applications. In particular, valve assembly 210 is configured to maintain a preselected pressure, or "pressure head" within the fuel tank 260 only when the vehicle (not shown) is stationary. This preselected pressure head advantageously aids in preventing overfilling of the fuel tank 260 during the fuel filling operation.

Because the fuel 262 is capable of expanding within the fuel tank 260 under certain temperature conditions, and because the fuel 262 is capable of producing fuel vapor, it is desirable to limit the level of the fuel 260 somewhat below the upper wall 266 of the fuel tank 260 in the filling operation to accommodate this expansion of fuel or creation of fuel vapor. This space is illustrated in FIG. 7 as an expansion volume 278. The amount of the expansion volume 278 is generally dictated by the placement of the inner end 274 of the filler neck 270 below the upper wall 266. This distance is designated by the numeral 282 in FIG. 7. When the fuel level within the fuel tank 260 rises above the inner end 274 of the filler neck 270, the fuel being inserted into the filler neck 270 then rises up the filler neck 270 to provide an indication to either the operator or an automatic shut-off on the filling apparatus to shut off the input of fuel. When this procedure is followed, the desirable expansion volume 278 is created in the upper portion of the fuel tank 260.

When the filler neck 270 is full of fuel, the level of the fuel within the filler neck 270 will be normally higher than the level of the fuel within the fuel tank 260. This difference in levels of fuel within the filler neck 270 and the fuel tank 260 is designated by the numeral 280 in FIG. 7. It will be understood that this higher level of fuel in the filler neck 270 creates a pressure, or "pressure head" that is exerted into the fuel tank 260. This pressure head will vary depending upon the distance 280 that the level of fuel in the filler neck 270 exceeds the level of fuel in the fuel tank 260.

If the valve assembly 210 permitted generally unrestricted vapor release during this filling operation, it will be understood that the pressure head created by the fuel in the filler neck 270 could cause the expansion volume 278 to decrease. This could occur because the pressure within the expansion volume 278 would be permitted to vent through the vent assembly 210 which would allow the fuel in the filler neck 270 to flow into the fuel tank 26 to cause the level of fuel to rise in the fuel tank 260. As previously discussed, it is desirable to maintain the preselected amount of expansion volume 278 in the fuel tank 260. To prevent the level of fuel from rising in the fuel tank 260 due to the pressure head created by the fuel in the filler neck 270, it is necessary to maintain a pressure head in the fuel tank 260 to overcome the pressure head created in the filler neck 270.

To provide the pressure head in the fuel tank 260 necessary to maintain the desired amount of expansion volume 278, it is necessary to seal the venting capability of the valve assembly 210 during the filling operation. To provide this sealing, the ball 236 is configured to seat in the orifice 232 when the vehicle is stationary. This permits the ball 236 to seal the orifice 232 to close off the venting capability of the valve assembly 210. The weight of the ball 236 is selected to maintain the proper pressure head within the fuel tank 260 to maintain the desired amount of expansion volume 278. Illustratively, if the filler neck 270 extends 10 inches above the upper wall 266 of the fuel tank 260, then the ball 236 can be selected to maintain a pressure head of 12 inches in the fuel tank 260. This will prevent the pressure head created in the filler neck 270 from reducing the desired amount of expansion volume 278 in the fuel tank 260.

After the filling operation is complete, and the proper expansion volume 278 has been created, it is desirable to permit generally unrestricted venting from the fuel tank 260 through the valve assembly 210. To permit this generally unrestricted venting, the ball 236, ball guide 240, and upper surface 230 of the platform 226 cooperate to permit the ball 236 to rattle within the ball guide 240 to open the orifice 232. By permitting the ball 236 to move away from the orifice 232, the valve assembly 210 then permits fuel vapor to vent from the fuel tank 260 in a generally unrestricted manner. Thus, as long as the vehicle (not shown) is in motion, the ball 236 is generally disabled from sealing the orifice 232. It will be understood that should the vehicle (not shown) remain stationary for a lengthy period of time after filling, the pressure in the fuel tank 260 could increase due to temperature. If the pressure in the fuel tank 260 exceeds the preselected sealing force of the ball 236, the ball 236 will be displaced from the orifice 232 momentarily to permit the pressure to vent through the valve assembly 210.

The embodiment illustrated in FIGS. 6 and 7 permits fuel vapor to vent from the fuel tank 260 whenever the vehicle (not shown) is in motion. In addition, the provision of the ball 236 allows a pressure head to be maintained in the fuel tank 260 during the fuel filling operation to aid in preventing overfilling of the fuel tank 260.

Figure 8:
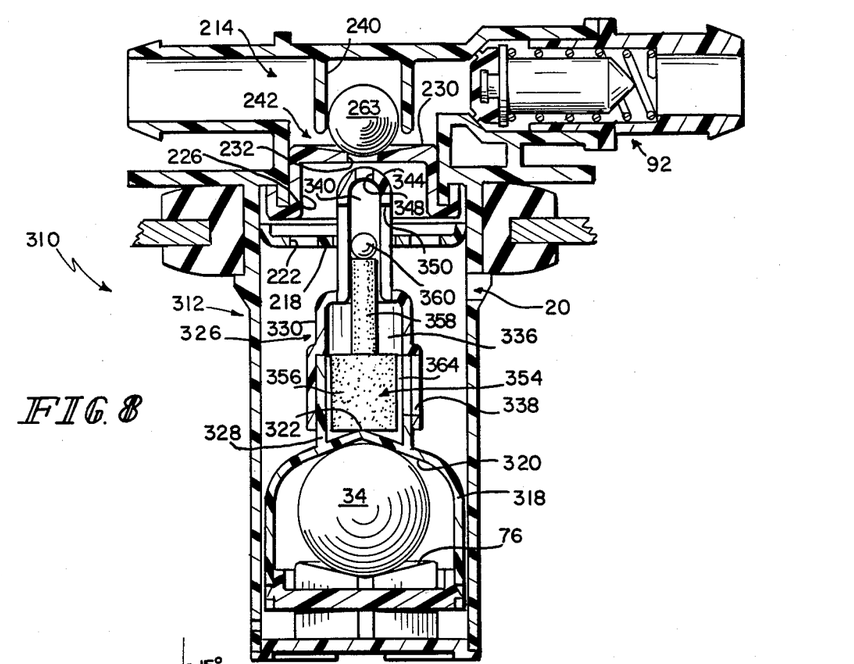
FIG. 8 is a transverse sectional view through yet another embodiment of the present invention.
Figure 9:
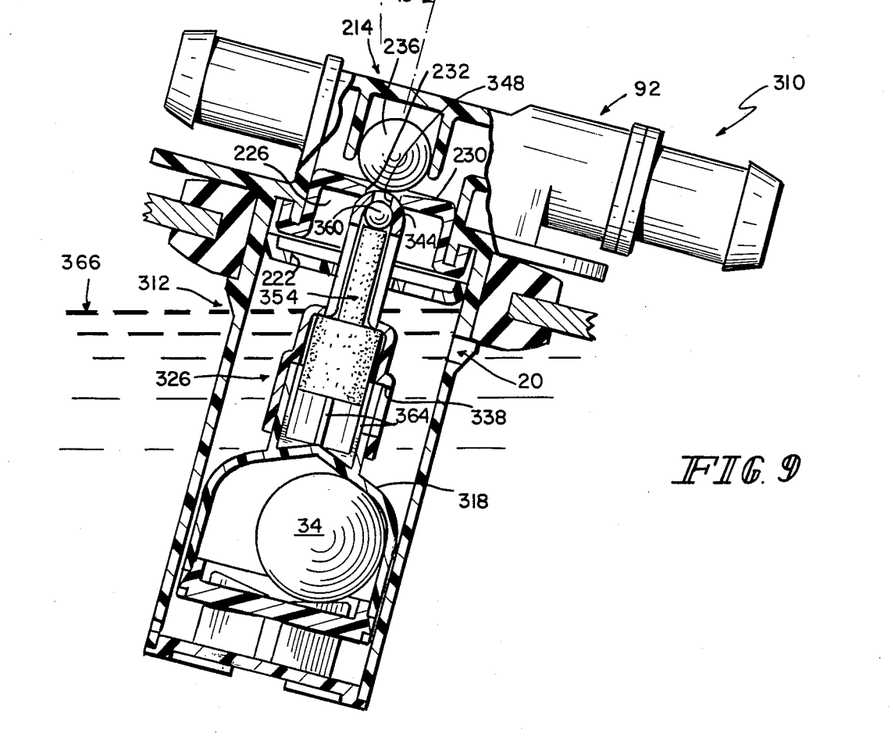
FIG. 9 is a transverse sectional view showing the embodiment of FIG. 8 in a tilted orientation with fuel present in the valve.
Figure 10:
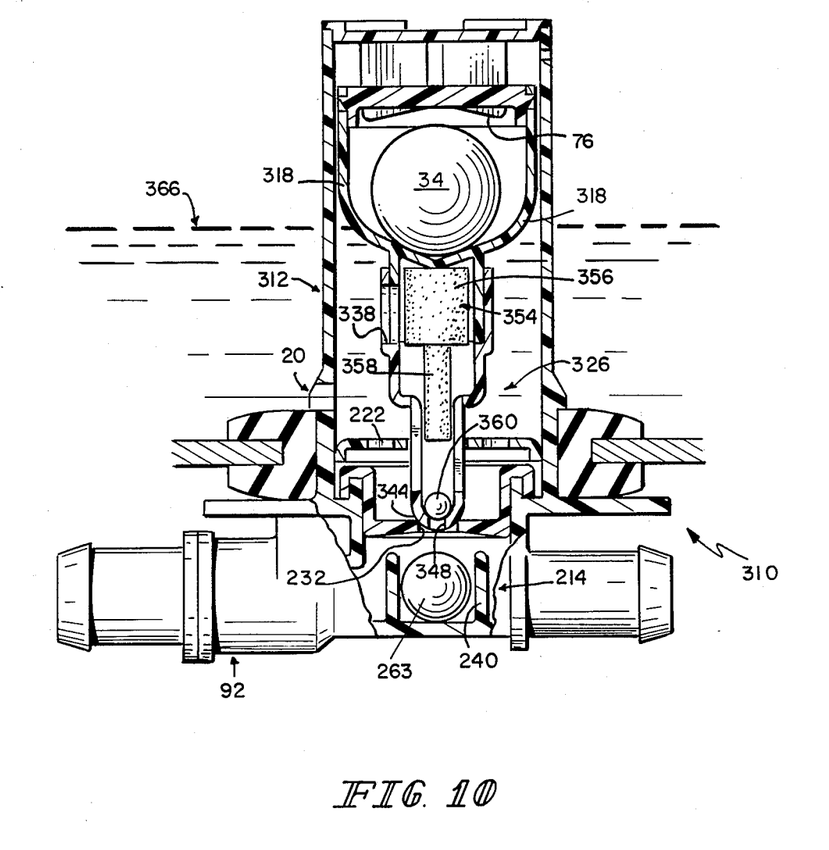
FIG. 10 is a transverse sectional view of the embodiment illustrated in FIG. 8 in a substantially inverted orientation.

FIGS. 8-10 show another embodiment of the invention that is a modification of the embodiment illustrated in FIGS. 6 and 7. Those elements referenced by numbers identical to those in FIGS. 1-7 perform the same or similar function. In the embodiment of the valve assembly 310 shown in FIG. 8, the valve housing 312 includes a pressure valve assembly 214 identical to that illustrated in FIGS. 6 and 7 to control the discharge of pressure from within a fuel tank (not shown). The valve assembly 310 includes a stem assembly 326 that has been modified somewhat when compared to the stem 42 of the embodiment shown in FIG. 6. Specifically, the stem assembly 326 includes an upper hole 348 that cooperates with air flow slots 350 to prevent the formation of a low pressure area that might otherwise be formed above the end 344 of the stem assembly 326 due to air or vapor flowing over the curved surfaces of the end 344 and through the orifice 232 in the platform 226. By preventing the formation of such a low pressure area, the likelihood that the stem assembly 326 could be prematurely lifted to seal the orifice 232 is eliminated. A ball 360 and float 354 are provided within the stem assembly 326 to provide two-stage sealing of the hole 348 under certain predetermined conditions to permit the stem assembly 326 to seal the orifice 232 to prevent fuel from flowing through the pressure valve assembly 214.

The valve assembly 310 in the embodiment illustrated in FIG. 8 includes a ball-receiving cup 318 that is somewhat different than the cup 40 illustrated in the embodiment of FIG. 6. Specifically, the cup 318 includes an upper ramp portion 320 that terminates in a raised portion 322 at the center of the cup 318. A stem assembly 326 is centered over the raised portion 322 and extends upwardly through the baffle guide plate 218 toward the orifice 232. Illustratively, the stem assembly 326 includes two separable components for ease of assembly. Specifically, a cylindrical upstanding wall component 328 is attached to the upper surface of the cup 318 and centered over the raised portion 322. An elongated stem 330 is provided that is slidably engageable with the wall component 328 to form the stem assembly 326.

When assembled, the stem assembly 326 includes a lower chamber 336 that is formed to include at least one fuel flow slot 338. The fuel flow slot 338 permits fluid communication between the chamber 336 and the interior of the valve housing 312. An upper, reduced diameter chamber 340 extends from the chamber 336 to the end 344 of the stem assembly 326. A hole 348 is formed in the end 344 of the stem assembly 326, with the center of the hole 348 substantially aligned with the center of the orifice 232 in the platform 226. The diameter of the hole 348 is somewhat smaller than the diameter of the orifice 232. Air flow slots 350 are formed in the sides of the stem assembly 326 to permit venting communication between the upper chamber 340, the interior of the valve housing 312, and the hole 348.

The hole 348 in the end 344 of the stem assembly 326 and the air flow slots 350 cooperate to prevent the formation of a low pressure area that might otherwise be formed above the end 344 of the stem assembly 326 by air or vapor flowing over the curved surfaces of the end 344 in the restricted area between the end 344 and the periphery of the orifice 232, and through the orifice 232. It has been found that air flow amounts above a specified level can create a low pressure area above the end 344 of sufficient strength to lift the stem assembly 326 upwardly to prematurely seal the orifice 232 in the absence of the hole 348 and air flow slots 350. The hole 348 and air flow slots 350 cooperate to permit air to flow outwardly through the hole 348 from the upper chamber 340 to prevent the formation of any low pressure area above the end 344. Specifically, air flows into the upper chamber 340 through the air flow slots 350 and out through the hole 348 to equalize the pressure above the end 344. It will be understood that this equalization of pressure prevents the formation of any low pressure area above the end 344, which in turn prevents any lifting force from being applied to the stem assembly 326.

A float 354 is provided that is disposed within the stem assembly 326. The float 354 may be a hollow metal float, or may be formed from a material that is buoyant in fuel. Specifically, it is desirable for the float material to have a specific gravity of approximately 0.25 to ensure that the float 354 will be buoyant in fuel. The float 354 includes a lower, generally cylindrical portion 356 and an upper, reduced diameter portion 358. The lower portion 356 is sized such that it is capable of axial movement within the lower chamber 336 of the stem assembly 326. The upper portion 358 of the float 354 is sized such that it is capable of axial movement within the upper chamber 340 of the stem assembly 326. Because of its construction, the float 354 is configured to move axially upwardly within the stem assembly 326 in response to fuel (FIGS. 9 and 10) that may flow into the upper and lower chambers 336, 340 through the fuel flow slot 338 under certain conditions. The lower portion 356 of the float 354 is configured to rest on the raised portion 322 to permit the float 354 to respond directly to any such in-flowing fuel. It will be understood that positioning the lower portion 356 on the raised portion 322 acts to prevent any possible adhesion that might otherwise occur between the bottom surface of the lower portion 356 and the bottom of the lower chamber 336. Axially extending ribs 364 are provided that are circumferentially spaced about the inner surface of the stem assembly 326 in the lower chamber 336. The ribs 364 act to guide and direct the float 354 as it axially moves within the stem assembly 326.

A ball 360 is provided that is disposed above the upper portion 358 of the float 354 within the upper chamber 340. The ball 360 is configured and sized to seal the hole 348 in the end 344 of the stem assembly 326 under certain predetermined conditions. The diameter of the ball 360 is somewhat greater than the size of the air flow slots 350 so that the ball 360 will be retained within the upper chamber 340. It will be understood that it is necessary to seal the hole 348 to permit the stem assembly 326 to effectively seal the orifice 232 when the stem assembly 326 is moved axially toward the orifice 232 in response to movement of the ball 34 within the cup 318. The movement of the ball 34 in response to tilting of the valve assembly 310 is identical to the movement of the ball 34 described previously related to FIGS. 1–5. Specifically, it will be understood that without sealing the hole 348, the stem assembly 326 cannot seal the orifice 232 because of the communication that would be established between the hole 348 and the air flow slots 350.

FIG. 9 shows one stage of sealing of the hole 348 by the ball 360 after the valve assembly 310 has been tilted to a predetermined angle. Illustratively, the valve assembly 310 has been tilted to an angle somewhat greater than 15° to cause the ball 34 to move within the cup 318 to raise the stem assembly 326 upwardly to a position where the end 344 is engaging the orifice 232. It will be understood that, because the valve assembly 310 is in direct communication with a vehicle fuel tank (not shown), fuel 366 may enter the valve housing 312 through the openings 20. The float 354, having a lower specific gravity than the fuel 366, will move within the stem assembly 326 to urge the ball 360 upwardly to seal the hole 348 in the end 344. In this position, the orifice 232 is sealed to prevent any of the fuel 366 from being discharged from the valve assembly 310 through the pressure valve assembly 214. Thus, in this stage of operation, the float 354 and ball 360 cooperate within the stem assembly 326 to seal the hole 348 to permit effective sealing of the orifice 232 by the stem assembly 326 in response to tilting and the presence of fuel 366 within the valve assembly 310. It will be understood that the float 354 will operate in the presence of fuel 366 to urge the ball 360 toward the hole 348 when the valve assembly 310 is tilted to a tilting position in the range of beyond 15° up to approximately 90°.

FIG. 10 shows a second stage of sealing of the hole 348 by the ball 360. Specifically, FIG. 10 shows the valve assembly 310 in a substantially inverted orientation. The ball 360 has been urged by gravity to seal the hole 348 in the end 344 of the stem assembly 326. The ball 34 has moved within the cup 318 to move the stem assembly 326 to a position where the end 344 is engaging the orifice 232. Fuel 366 from the vehicle fuel tank (not shown) is thus prevented from escaping from the valve assembly 310 through the pressure valve assembly 214 by the stem assembly 326 sealing the orifice 232 and the ball 360 sealing the hole 348. It will be understood that in this orientation, the ball 360 does not require the urging force from the float 354 to seal the hole 348 as was required in the orientation illustrated in FIG. 9. Therefore, the float 354 is permitted to float axially away from the ball 360 in the orientation illustrated in FIG. 10 to a non-use position without affecting the sealing capability of the ball 360. It will be understood that the ball 360 will be urged by gravity to seal the hole 348 when the valve assembly 310 is tilted to a tilting position past approximately 90°.

Thus, the valve assembly 310 illustrated in FIGS. 8–10 is capable of preventing any lifting force due to high flow rates of vapor or air over the end 344 of the stem assembly 326. The provision of the float 354 and ball 360 permits effective sealing of the orifice 232 to prevent fuel from being discharged from the valve assembly 310. The ball 360 and float 354 cooperate to seal the hole 348 under predetermined conditions to permit the stem assembly 326 to function much like the stem 42 in the embodiments illustrated in FIGS. 1–6.

Figure 11:
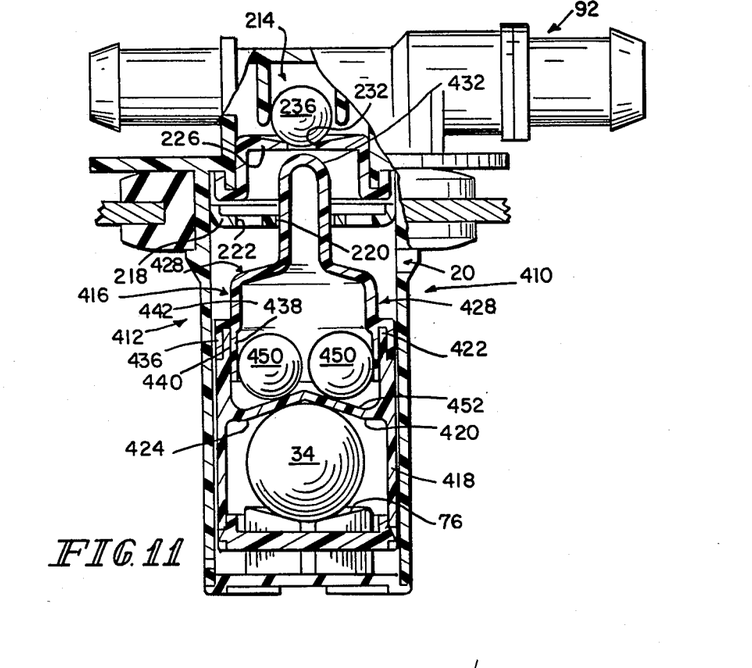
FIG. 11 is a transverse sectional view through yet another embodiment of the present invention.
Figure 12:
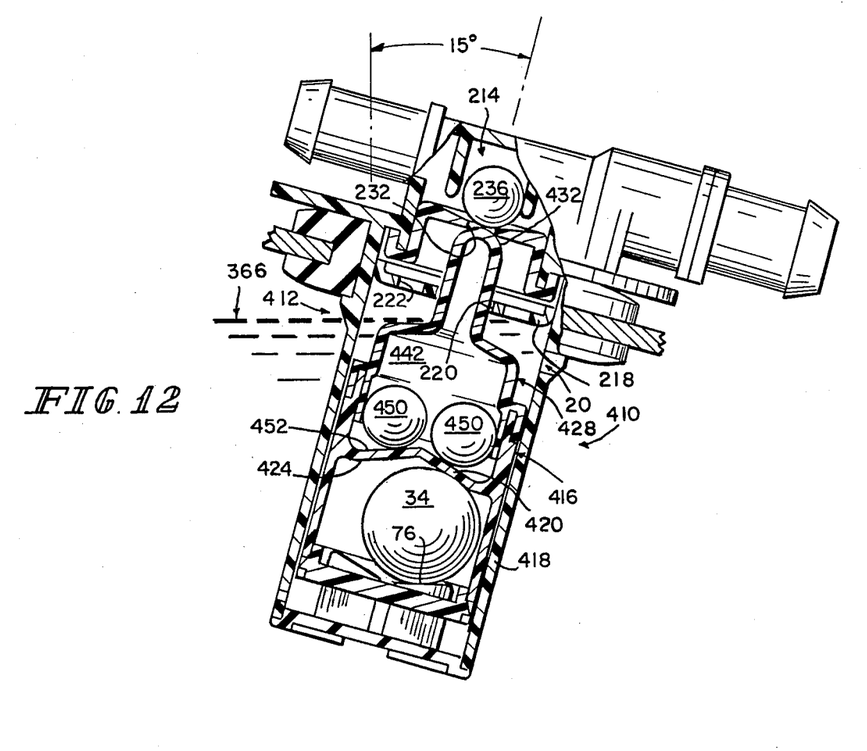
FIG. 12 is a transverse sectional view showing the embodiment of FIG. 11 in a tilted orientation with fuel present in the valve.

FIGS. 11 and 12 show another embodiment of the invention that is a modification of the embodiment illustrated in FIGS. 8–10. Those elements referenced by numbers identical to those in FIGS. 1–10 perform the same or similar function. In the embodiment of the valve assembly 410 shown in FIGS. 11 and 12, the valve housing 412 includes a pressure valve assembly 214 identical to that illustrated in FIGS. 6–10 to control the discharge of pressure from within a fuel tank (not shown). The valve assembly 410 illustrated in FIGS. 11 and 12 differs from the embodiment illustrated in FIGS. 8–10 in the manner in which the lift created by the formation of a low pressure area above the stem is compensated for.

In the embodiment illustrated in FIGS. 8–10, the stem assembly 326 was modified to include an upper hole 348 and air flow slots 350 to actually prevent the formation of the low pressure area that might otherwise be formed above the end 344 of the stem assembly 326 due to air or vapor flowing over the curved surfaces of the end 344. Thus, in the embodiment illustrated in FIGS. 8–10, no lift was imposed upon the stem assembly 326 because the low pressure area above the end 344 of the stem assembly 326 was prevented from forming.

In the embodiment of the valve assembly 410 illustrated in FIGS. 11 and 12, the low pressure area above the end 432 of the stem member 428 is permitted to form, however the lift imposed upon the stem member 428 is counteracted by anti-lift means. The anti-lift means includes means for downwardly applying a predetermined retaining force to the valve member 416 to aid in preventing premature upward movement of the valve member 416 due to the lifting force exerted by the low pressure area.

In the preferred embodiment, the applying means includes weighted members in the form of weighted balls 450 that are placed within the stem member 428. Ideally, the weight of the weighted members, or balls 450, is selected to closely approximate and counteract the amount of lifting force that may be exerted upon the stem member 428 by the formation of the low pressure area.

To enable the valve member 416 and attached stem member 428 to function normally to seal the orifice 232 when the valve assembly 410 is tilted, the anti-lift means further includes means for neutralizing the predetermined retaining force exerted by the applying means. In the preferred embodiment, the neutralizing means includes an upper chamber 442 that is sealed so that a buoyant force is created when fuel enters the valve housing 412. The buoyant force created by the upper sealed chamber 442 when exposed to fuel is sufficient to overcome the oppositely directed force exerted by the weighted balls 450. This permits the valve member 416 and stem member 428 to move normally when urged upwardly by the actuating ball 34.

The valve assembly 410 in the embodiment illustrated in FIG. 11 includes a valve housing 412 having openings 20 to permit the inflow of fuel vapor or fuel. A valve member 416 is disposed within the valve housing 412 for movement therein. The valve member 416 includes a ball-receiving cup 418 that is configured to receive the actuating ball 34. The ball-receiving cup 418 is separated from the remainder of the valve member 416 by an inwardly and upwardly sloping partition 420. The partition 420 forms an upper ramp portion 424 similar to the ramp portion 320 in the embodiment illustrated in FIG. 8.

A cylindrical, upstanding wall 422 extends axially upwardly from the ball-receiving cup 418. The upstanding wall 422 is configured to mate with a stem member 428 to form the complete valve member 416. The stem member 428 terminates in an axially upper end 432 that is sized and configured to seal the orifice 232 in the platform 226. The stem member 428 includes an annular, downwardly extending flange 436 that cooperates with an inner wall 438 to form a channel 440 that mates with the upstanding wall 422 to sealingly engage the stem member 428 to the ball-receiving cup 418. It will be understood that any method of engaging the channel 440 with the upstanding wall 422 to provide a fluid-tight seal may be used. In the preferred embodiment, the upstanding wall 422 is sonically welded into the channel 440 to provide the fluid-tight seal. By providing a fluid-tight seal between the channel 440 and the upstanding wall 422, a sealed chamber 442 is created within the stem member 428 that is bounded at the axially lower end by the partition 420.

Two weighted members or weighted balls 450 are disposed within the sealed chamber 442 that rest upon the partition 420. The sloped partition 420 creates a race 452 which acts both to capture the balls 450, and to permit the balls 450 to roll around the partition 420 when the valve assembly 410 is tilted. As discussed previously, the weight of the balls 450 is selected such that the total weight of the two balls 450 is substantially equal to the lifting force that may be exerted upon the stem member 428 by the low pressure area that may be created due to vapor flow over the curved end 432 of a stem member 428.

Illustratively, in the embodiment illustrated in FIG. 11, the balls 450 are carbon steel balls that each have a weight of 2.7 grams for a total counteracting weight of 5.4 grams. It will be understood that different weights of the balls 450 may be necessary to counteract the lifting force on the stem member 428 to accommodate different sizes and configurations of the valve assembly 410. However, so long as the total weight of the balls 450 is substantially equal to the lifting force that is exerted upon the stem member 428, the counteracting weight of the balls 450 will prevent the stem member 428 from being urged upwardly to prematurely seal the orifice 232 by such lifting force.

FIG. 12 shows the stem member 428 urged to a position to seal the orifice 232 after the valve assembly 410 has been tilted to a predetermined angle. Illustratively, the valve assembly 410 has been tilted to an angle of approximately 15° to cause the ball 34 to move within the ball-receiving cup 418 on the ramping surfaces 76, 424 to urge the valve member 416, and specifically the stem member 428, upwardly to a position where the end 432 is sealing the orifice 232. It will be understood that, because the valve assembly 410 is in direct communication with a vehicle fuel tank (not shown), fuel 366 may enter the valve housing 412 through the openings 20. A portion of the fuel 366 that enters the valve housing 412 will be displaced by the valve member 416, and specifically will be displaced by the sealed chamber 442 defined within the stem member 428 above the partition 420. It will be understood by those skilled in the art that the buoyant force exerted axially upwardly on the valve member 416 will be equal to the weight of the fuel 366 that is displaced. Ideally, the sealed chamber 442 will be sized to displace an amount of fuel 366 that will produce a buoyant force that is approximately equal to the force exerted axially downwardly on the valve member 416 by the weighted balls 450.

Configuring the valve member 416 to produce a buoyant force that is approximately equal to the downward force exerted by the weighted balls 450 effectively neutralizes any adverse effect that the balls 450 may otherwise have on the desired movement of the valve member 416 when the valve assembly 410 is tilted. Specifically, it will be understood that the weight of the balls 450 could adversely inhibit the ramping action of the ball 34 as the valve assembly 410 is tilted. This could disadvantageously affect the movement of the stem member 428 toward its sealing position in the orifice 232 as the valve assembly 410 is tilted. The buoyant force exerted upon the valve member 416 offsets the additional weight added to the valve member 416 by the weighted balls 450, thus permitting normal movement of the valve member 416. This normal movement of the valve member 416 has been discussed previously related to the embodiments shown in FIGS. 1-7, and will not be discussed here in detail.

It has been found that the balls 450 also have an additional action on the valve member 416 that disrupts somewhat the lifting force that is imposed upon the valve member 416 by the low pressure area formed over the end 432. When the valve assembly 410 is tilted as illustrated in FIG. 12, the balls 450 are able to roll within the race 452. This rolling action of the balls 450 can act to move or cock the stem member 428 somewhat within the opening 220 in the guide plate 218. This movement, or cocking of the stem member 428 can decrease somewhat the amount of lift that is imposed on the stem member 428. Although this disruption of lift is small, it is not insignificant, and it aids in preventing lifting of the valve member 416 to prematurely seal the orifice 232.

Thus, the valve assembly 410 illustrated in FIGS. 11 and 12 is capable of counteracting any aerodynamic lifting force that is imposed upon the valve member 416 due to high flow rates of vapor or air over the end 432 of the stem member 428. The weighted balls 450 disposed within the sealed chamber 442 are selected to counteract the lifting force imposed upon the valve member 416. The sealed chamber 442 is configured to displace fuel that may enter the valve housing 412 when the valve assembly 410 is tilted to produce a buoyant force on the valve member 416. This buoyant force offsets any adverse affect upon the normal movement of the valve member 416 due to the additional weight of the weighted balls 450 within the valve member 416.

Although the invention has been described in detail with reference to certain preferred embodiments, variations and modifications exist within the scope and spirit of the invention as described and defined in the following claims.

What is claimed is:

1. A roll-over valve for use in a vehicle fuel system having outlet means for discharging fuel vapor, the roll-over valve comprising
    a hollow valve member having an external surface positioned to encounter fuel vapor flow,
    roll-over means for moving the hollow valve member from an outlet-opening position to an outlet-closing position in response to tilting of the hollow valve member during vehicle rollover conditions, and
    anti-lift means in the hollow valve member for counteracting aerodynamic forces generated by the shape of said external surface of the hollow valve member during exposure of said external surface to fuel vapor flow and exerted on the hollow valve member during discharge of fuel vapor through the outlet means, the anti-lift means including means for downwardly applying a predetermined retaining force to the hollow valve member to prevent substantial premature upward movement of the hollow valve member toward closing engagement with the outlet means induced by said aerodynamic forces and means for providing a releasing force opposing the retaining force during vehicle roll-over conditions upon exposure of the hollow valve member to fuel from the fuel system to permit normal unimpeded movement of the hollow valve member toward its outlet-closing position during operation of the roll-over means.

2. The roll-over valve of claim 1, wherein the anti-lift means is positioned in a region provided between the outlet means and the roll-over means in spaced-apart relation to the roll-over means.

3. The roll-over valve of claim 1, wherein the applying means includes at least one weighted member having a predetermined mass selected to cause the magnitude of the downward predetermined retaining force to be substantaily equivalent to the magnitude of the upward external aerodynamic force.

4. The roll-over valve of claim 1, wherein the means for providing a releasing force includes a buoyant container having a volume selected to displace a predetermined amount of fuel in the vehicle fuel system during vehicle rollover conditions upon exposure of the hollow valve member to fuel from the fuel system so that the buoyant container generates an upward buoyant force having a magnitude that is substantially equivalent to the magnitude of the downward predetermined retaining force.

5. The roll-over valve of claim 4, wherein the applying means includes at least one weighted member positioned within the interior of the buoyant container and movable therein.

6. The roll-over valve of claim 4, wherein the buoyant container is provided by a sealed chamber formed in the hollow valve member.

7. The roll-over valve of claim 1, wherein the hollow valve member includes an upper closing portion for selectively closing the outlet means and a lower actuating portion housing the roll-over means, the upper closing portion and the lower actuating portion cooperate to define a buoyant sealed chamber therebetween providing the means for providing a releasing force, the applying means includes at least one weighted member in the interior of the buoyant sealed chamber, and the buoyant sealed chamber is sized to displace a predetermined amount of fuel upon exposure to fuel during vehicle roll-over conditions, thereby generating a buoyant force in substantially equal opposition to the retaining force genertated by the weighted members.

8. The roll-over valve of claim 1, further comprising valve housing means for guiding the movable hollow valve member along a substantially straight axial path extending between the outlet-opening and outlet-closing positions of the hollow valve member, and wherein the roll-over means includes a movable actuating member and at least one inclined ramp portion contacting the actuating member in camming relation, the actuation member rides on said at least one inclined ramp portion in a radially-outward direction in response to tilting the hollow valve member to move the hollow valve member to its outlet-closing position, and the applying means and the means for providing a releasing force are configured to exert substantially equal and opposite forces on the roll-over means during vehicle roll-over conditions upon exposure of the hollow valve member to fuel from the fuel system so that inertial movement of the actuating member in the radially-outward direction on the at least one inclined ramp portion due to inertia of the actuating member established during tilting of the hollow valve member is substantially unaffected by the anti-lift means.

9. A roll-over valve for use in a vehicle fuel system having outlet means for discharging fuel vapor, the roll-over valve comprising
    a hollow valve member terminating in a distal tip, the hollow valve member being movable between an outlet-opening position wherein the distal tip and the outlet means cooperate to define a venturi passage therebetween and an outlet-closing position wherein the distal tip sealingly engages the outlet means,
    roll-over means for moving the hollow valve member from its outlet-opening position to its outlet-closing position in response to tilting of the hollow valve member during vehicle rollover conditions, retaining means in the hollow valve member for continuously retaining the hollow valve member in its outlet-opening position until the hollow valve member is moved toward its outlet-closing position by the roll-over means, the retaining means normally operating to exert a retaining force which acts to counteract movement-inducing effects of aerodynamic lift forces exerted on the distal tip due to high fuel vapor flow conditions existing in the venturi passage during discharge of fuel vapor through the outlet means so that premature sealing engagement of the distal tip and the outlet means is substantially prevented, the hollow valve member being configured to float in fuel displaced by the hollow valve member during vehicle rollover conditions to exert buoyant forces on the hollow valve member which oppose the retaining force to permit normal unimpeded movement of the hollow valve member toward its outlet-closing position during operation of the roll-over means.

10. The roll-over valve of claim 9, wherein the hollow valve member is formed to include a sealed interior chamber for buoyantly supporting the hollow valve member in fuel surrounding the hollow valve member during vehicle rollover conditions.

11. The roll-over valve of claim 10, wherein the hollow valve member is formed to include a lower chamber housing the roll-over means, and the sealed interior chamber is situated intermediate the distal tip and the lower chamber.

12. The roll-over valve of claim 10, wherein the retaining means includes at least one weighted member positioned within the interior of the sealed interior chamber.

13. The roll-over valve of claim 12, wherein the at least one weighted member has a mass selected to apply a downward predetermined retaining force to the hollow valve member that is substantially equivalent to a maximum upward aerodynamic lift force exerted on the distal tip during discharge of fuel vapor through the outlet means to aid in preventing premature upward movement of the hollow valve member toward its outlet-closing position.

14. The roll-over valve of claim 12, wherein the at least one weighted member is freely movable within the sealed interior chamber.

15. The roll-over valve of claim 12, wherein the volume of the sealed chamber is selected to cause the hollow valve member to displace a predetermined amount of fuel in the vehicle fuel system during vehicle rollover conditions so that the buoyant hollow valve member generates an upward buoyant force having a magnitude that is substantially equivalent to the magnitude of a downward retaining force exerted on the hollow valve member by the at least one weighted member.

16. The roll-over valve of claim 9, further comprising valve housing means for guiding the movable hollow valve member along a substantially straight axial path extending between the outlet-opening and the outlet-closing positions of the hollow valve member, and wherein the hollow valve member is formed to include a sealed interior chamber for buoyantly supporting the hollow valve member in fuel surrounding the hollow valve member during vehicle rollover conditions, the retaining means includes at least one weighted member having a mass selected to apply a downward predetermined retaining force to the hollow valve member, the roll-over means includes a movable actuating member and at least one inclined ramp portion contacting the actuating member in camming relation, the actuation member rides on said at least one inclined ramp portion in a radially-outward direction in response to tilting the hollow valve member to move the hollow valve member to its outlet-closing position, and the buoyant sealed interior chamber and the at least one weighted member exert substantially equal and opposite forces on the roll-over means during vehicle rollover conditions so that inertial movement of the actuating member in the radially-outward direction on the at least one inclined ramp portion due to inertia of the actuating member established during tilting of the hollow valve member is substantially unaffected by the downward predetermined retaining force.

17. The roll-over valve of claim 16, wherein the at least one weighted member is positioned and freely movable within the interior of the sealed interior chamber.

18. The roll-over valve of claim 16, wherein the mass of the at least one weighted member is selected to cause the downward predetermined retaining force to be substantially equivalent to a maximum upward aerodynamic lift force exerted on the distal tip during discharge of fuel vapor through the outlet means to aid in preventing upward movement of the hollow valve member toward its outlet-closing position.

19. A roll-over valve for use in a vehicle fuel system, the roll-over valve comprising a hollow valve housing having a longitudinal axis, an inlet for admitting fuel vapor from the vehicle fuel system into the valve housing, and an outlet for discharging fuel vapor from the valve housing, a valve member positioned within the hollow valve housing for movement between an outlet-opening position and an outlet-closing position, the valve member including a closing piece and a valve body having upper and lower portions, the closing piece being formed to include a downwardly-opening valve shell and terminating in a distal tip for selectively blocking the outlet, the upper portion of the valve body being coupled to the downwardly-opening valve shell to define a sealed interior chamber of predetermined volume therebetween for buoyantly supporting the valve member in fuel admitted into the hollow valve housing during vehicle rollover conditions, roll-over means in the lower portion of the valve body for moving the valve member from an outlet-opening position to an outlet-closing position in response to tilting the valve member during vehicle rollover conditions, and at least one weighted member in the sealed interior chamber for downwardly applying a predetermined retaining force to the valve member to aid in preventing premature movement of the valve member toward its outlet-closing position.

20. The roll-over valve of claim 19, wherein the predetermined volume of the sealed interior chamber is selected to cause the valve member to displace a predetermined amount of fuel in the hollow valve housing during vehicle rollover conditions so that the buoyant valve member generates an upward buoyant force having a magnitude that is substantially equivalent to the magnitude of downward predetermined retaining force exerted on the valve member by the at least one weighted member to counteract the predetermined retaining force during vehicle rollover conditions, thereby permitting normal unimpeded movement of the valve member toward its outlet-closing position during operation of the roll-over means.

21. The roll-over valve of claim 19, wherein the at least one weighted member has a mass selected to apply a downward predetermined retaining force to the hollow valve member that is substantially equivalent to a maximum upward aerodynamic lift force exerted on the distal tip during discharge of fuel vapor through the outlet to aid in preventing premature upward movement of the hollow valve member toward its outlet-closing position.

22. The roll-over valve of claim 19, further comprising base means for retaining the movable valve member within the valve housing, and wherein the lower portion of the valve body is formed to include a downwardly-opening ball-receiving cup, the base means is coupled to the valve housing to define a ball-receiving space between the base means and the ball-receiving cup, a roll-over ball is positioned in the ball-receiving space, at least one of the base means and the ball-receiving cup includes ramp means for contacting the roll-over ball in the ball-receiving space, the roll-over ball and ramp means cooperate to provide the roll-over means as the roll-over ball rides on the ramp means in a radially-outward direction to move the closing piece to its outlet-blocking position in response to predetermined tilting movements of the valve member, and the buoyant sealed interior chamber and the at least one weighted member exert substantially equal and opposite forces on the roll-over means during vehicle rollover conditions so that inertial movement of the roll-over ball in the radially-outward direction on the ramp means due to inertia of the roll-over ball established during tilting of the valve member is substantially unaffected by the downward predetermined retaining force.

23. The roll-over valve of claim 19, wherein the at least one weighted member is freely movable within the sealed interior chamber.

24. The roll-over valve of claim 19, wherein the sealed interior chamber includes a conically-shaped bottom wall extending a predetermined distance into the chamber.

25. The roll-over valve of claim 19, wherein the valve body includes a conically-shaped top wall extending into the overlying sealed interior chamber and an upstanding side wall connected to a circumferentially-extending lower edge of the conically-shaped top wall to define the lowermost portion of the sealed interior chamber, the upstanding side wall being sealing coupled to the downwardly-opening valve shell.

26. The roll-over valve of claim 1, wherein the anti-lift means is configured to provide means for permitting relative movement between the hollow valve member and the means for downwardly applying a predetermined retaining force to the hollow valve member.

27. The roll-over valve of claim 9, wherein the anti-lift means is configured to provide means for permitting relative movement between the hollow valve member and the means for downwardly applying a predetermined retaining force to the hollow valve member.

* * * * *